Oct. 26, 1943.  J. W. BELL ET AL  2,332,689
GARMENT SIZING AND SHAPING FORM
Filed Sept. 21, 1940    7 Sheets-Sheet 2
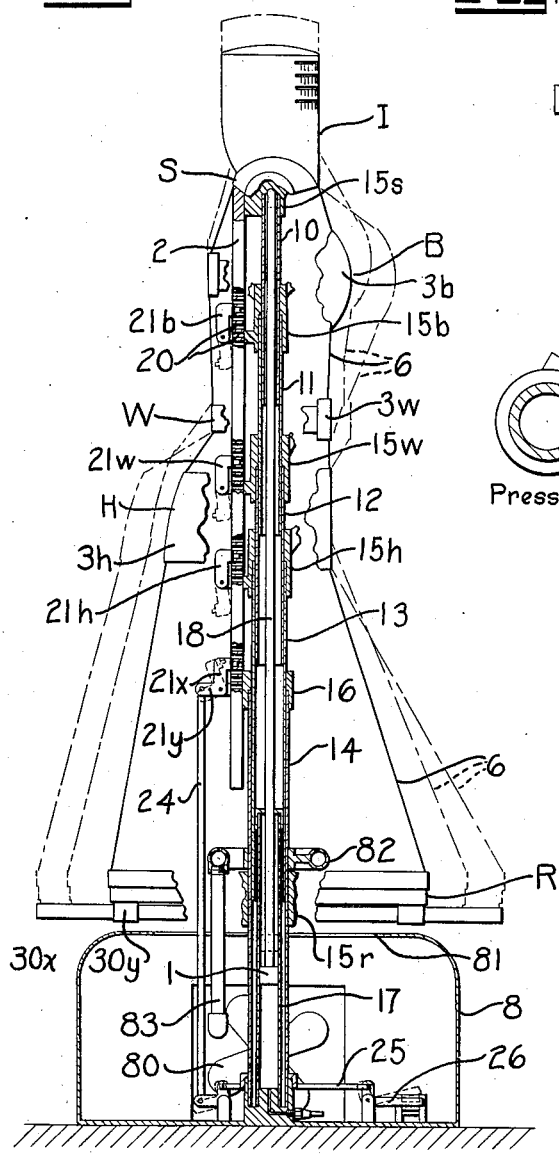
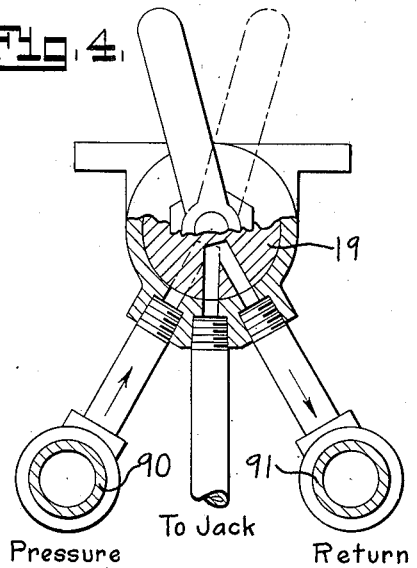
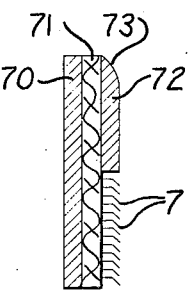
Inventors
John W. Bell
Alfred F. Larsen
By Reynolds & Beach
Attorneys Oct. 26, 1943.  J. W. BELL ET AL  2,332,689
GARMENT SIZING AND SHAPING FORM
Filed Sept. 21, 1940  7 Sheets-Sheet 3
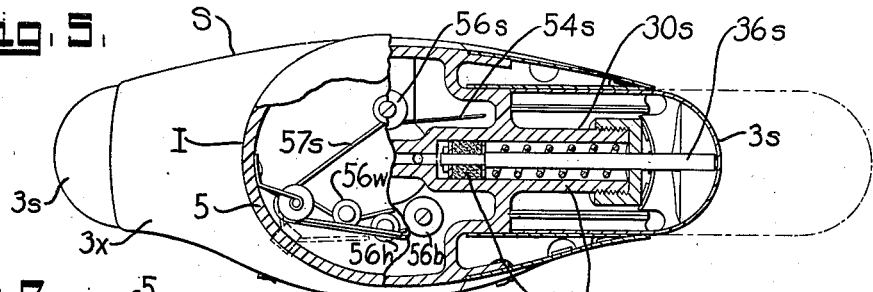
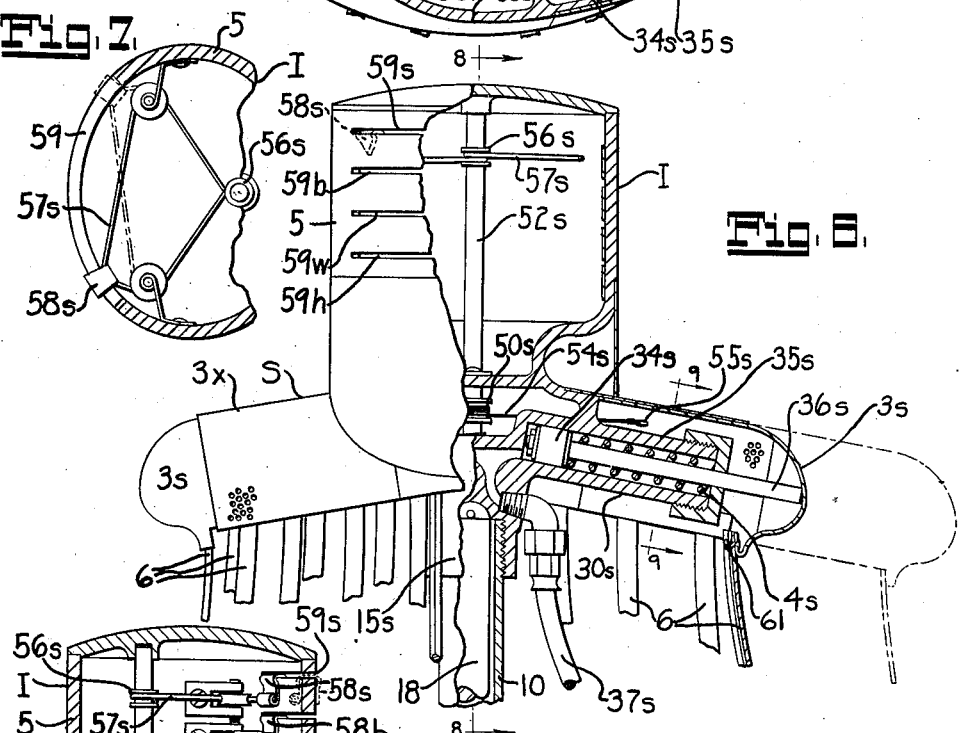
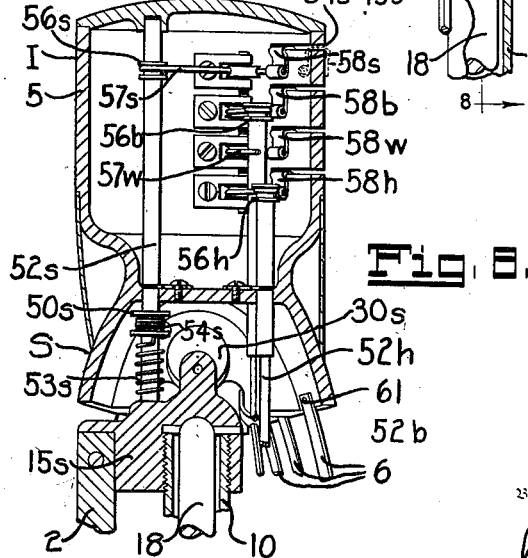
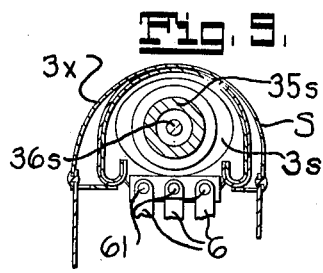
Inventors
John W. Bell
Alfred F. Larsen
By Reynolds & Beach
Attorneys

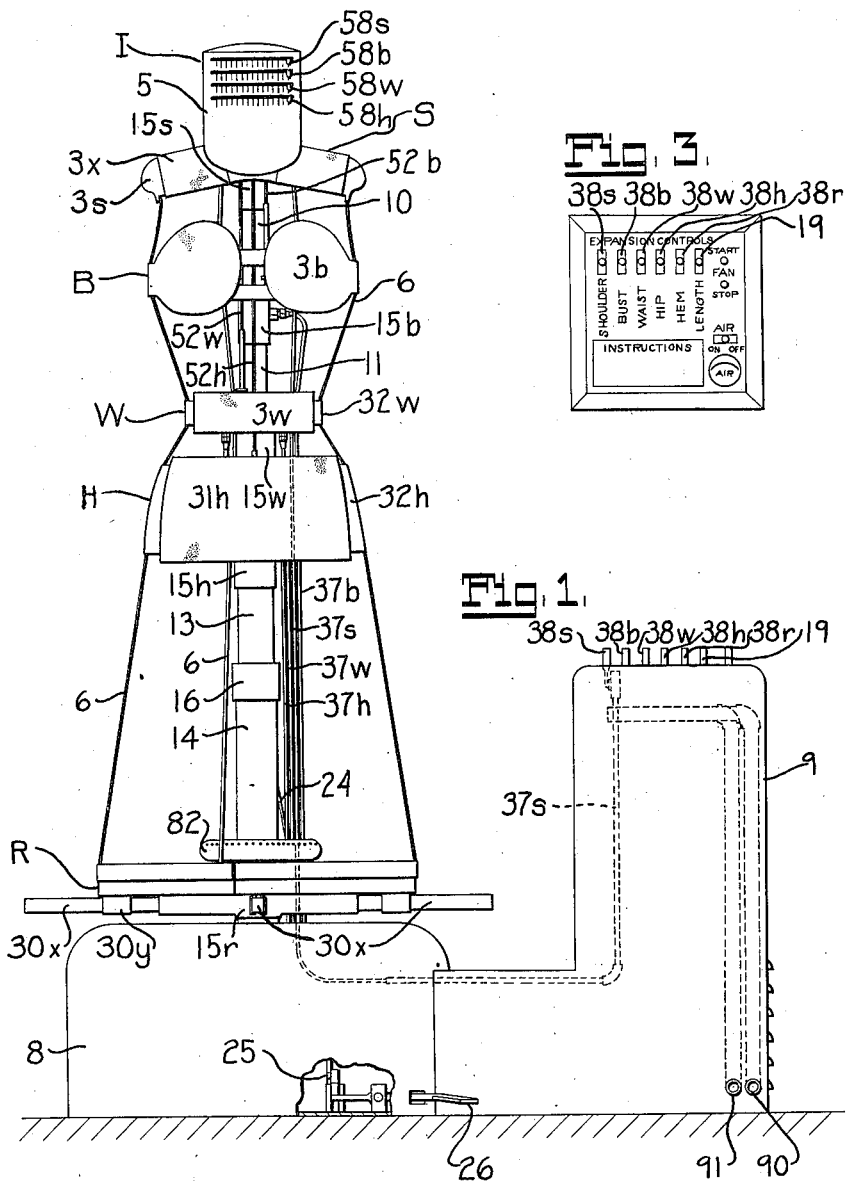

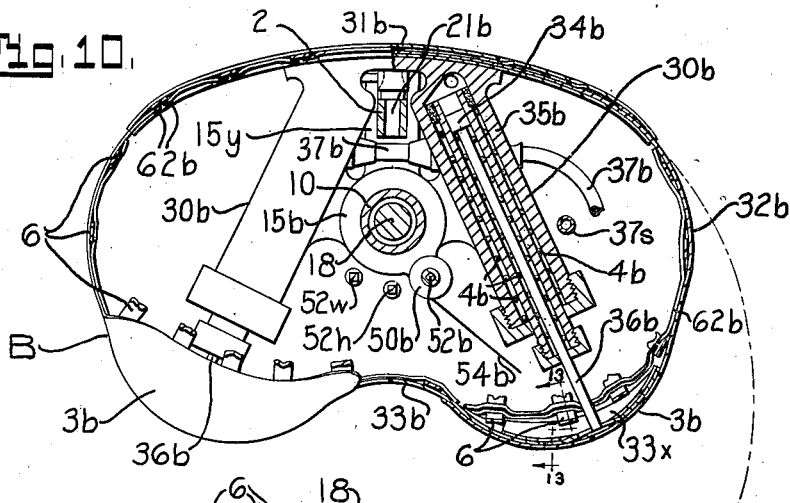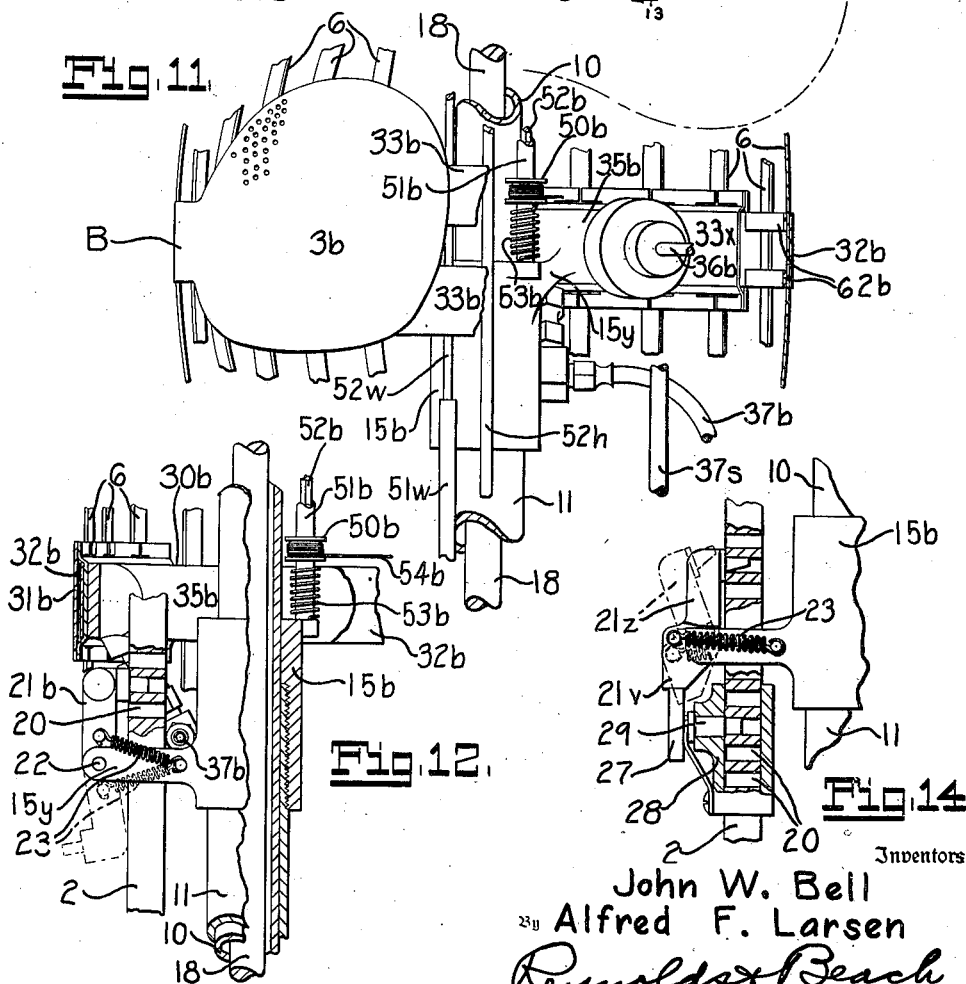

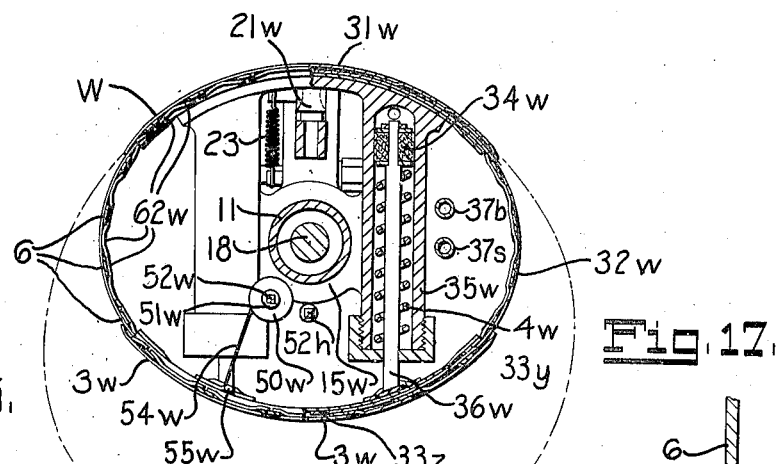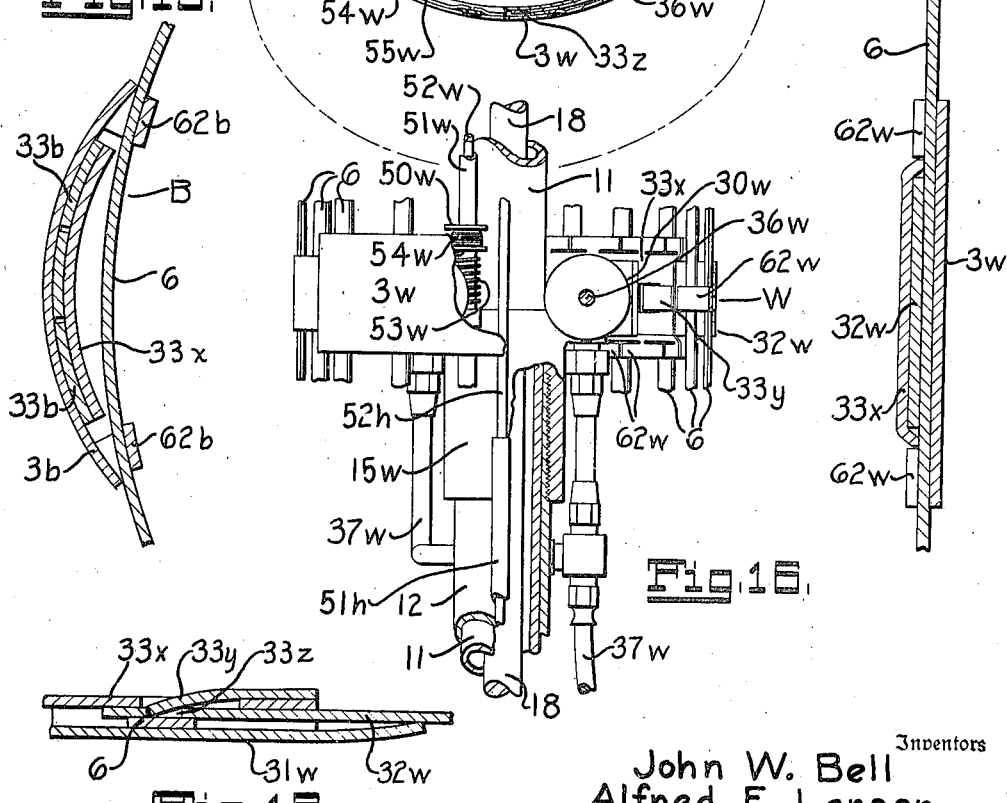

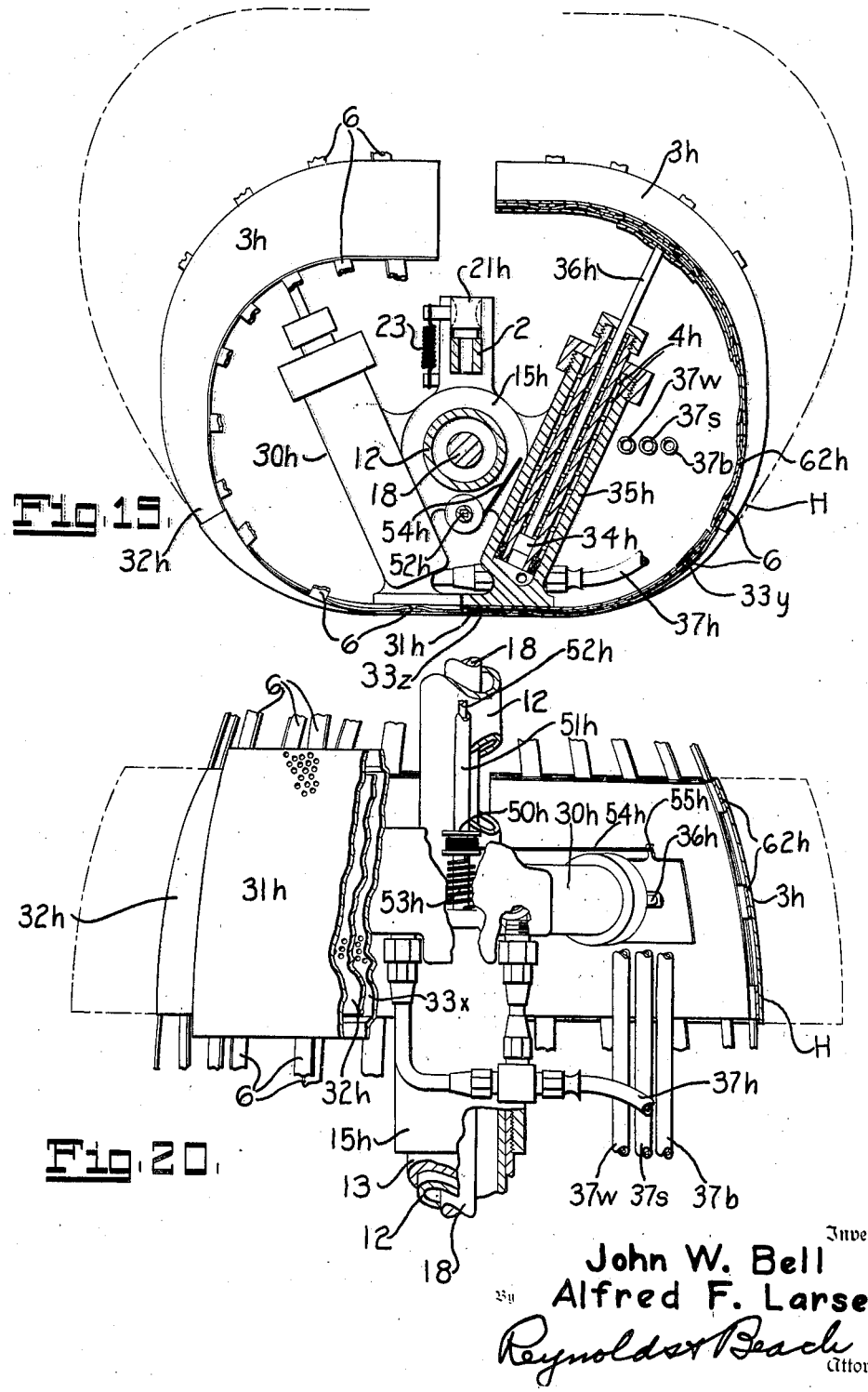

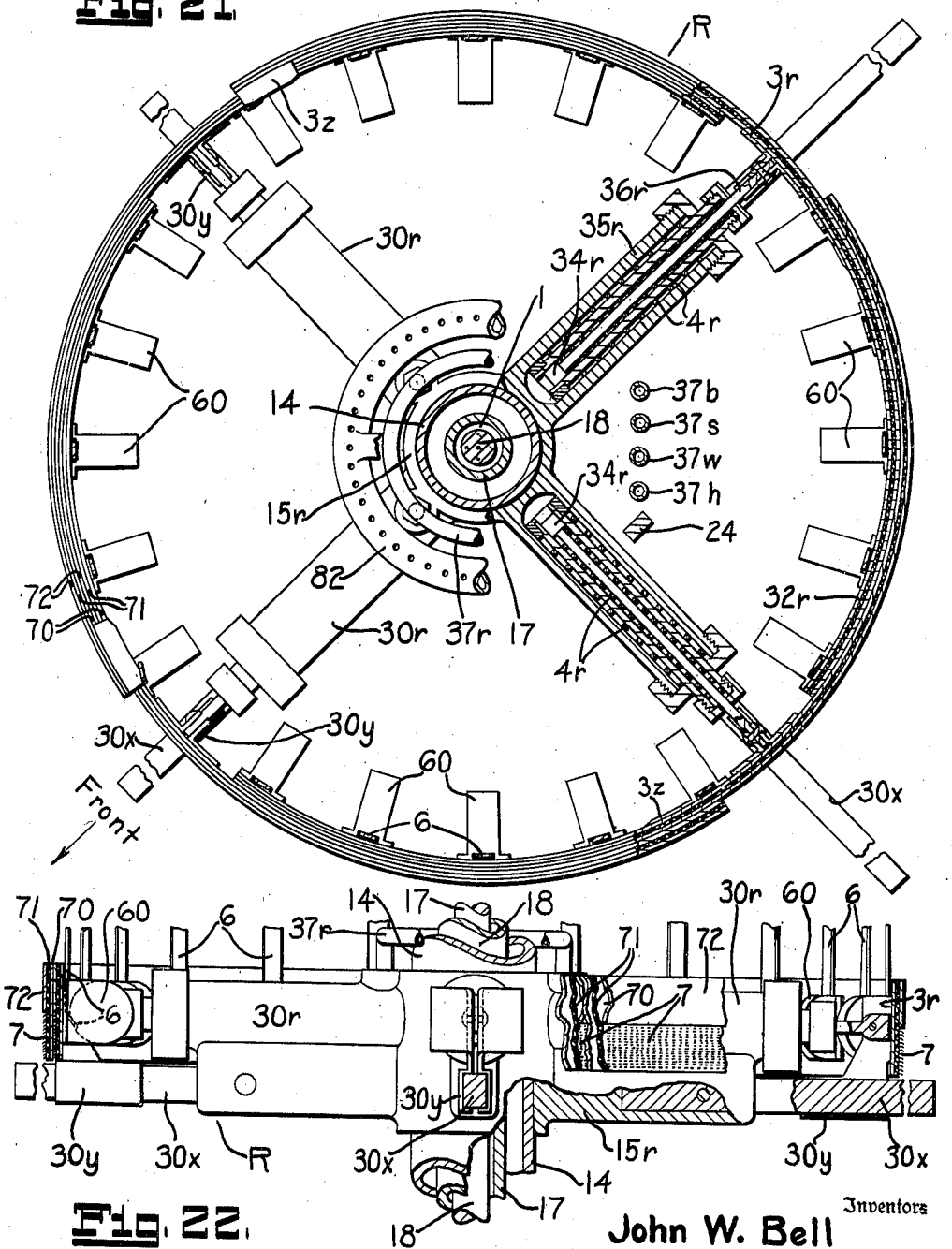

Patented Oct. 26, 1943

2,332,689

UNITED STATES PATENT OFFICE 2,332,689

GARMENT SIZING AND SHAPING FORM

John W. Bell and Alfred F. Larsen, Seattle, Wash., assignors of one-third to Charles H. Fierce, Seattle, Wash.

Application September 21, 1940, Serial No. 357,780

7 Claims. (Cl. 223—70)

Garments, when cleaned, are subjected to processes which cause them to shrink, particularly when made of certain materials. Cleaners attempt to bring such garments back to their original size and dimensions in all respects, but have usually employed flat forms or tables for measurement and stretching of the garments, flatwise. The human form, however, is a three-dimensional figure, and flatwise measurements and stretching do not accurately reproduce the human figure nor make the garment conform thereto. The garment may be unduly stretched in certain regions and not sufficiently stretched in other regions, and the result is that it fails to fit the figure properly, and may be damaged by the abnormal stresses.

Forms have been proposed heretofore that act in the nature of three-dimensional figures, adjustable in various directions and in various zones correspondingly to the size variations in such zones of the human figure, and corresponding to the variations in size and shape of different human figures. Such figures have been a great improvement, but because they are expensive, and because a great number of dresses must be handled by the cleaner in a day's time, such figures have not proven altogether economical in use because of the time required and the other difficulties attendant upon adjustment in the various respects required to fit different figures. Each dress fitted upon such a figure requires individual adjustment to fit that particular dress, and unless such adjustments, as to height and spacing of the different zones such as the shoulders, bust, waist, hips, and hem, and as to measurements in the several zones, can be made quickly and yet accurately, so much time is consumed that a single figure cannot handle the volume required, and for the cleaner to acquire additional figures increases the cost to a point where the use of such figures becomes uneconomical.

The primary object of the present invention is to produce a three-dimensional figure of the general nature indicated, capable of adjustment as to height and as to spacing of the various circumferential zones, and capable of adjustment in each zone to fit the variations of human figures, and preferably adjustable in such zones in the directions and by the amounts which correspond to human size variations in the respective zones, and furthermore to provide such a figure in which the adjustments are quickly and conveniently made, preferably by power means. Likewise it is an object to provide such a figure which is mechanically simple, therefore relatively inexpensive, and rugged, and easy to operate.

Preferably also, according to this invention, such adjustments are made by controls which are operable from a remote point externally of the figure. Thereby, in large measure, they may be made without reaching within the form, and consequently may be made after a dress has been applied to the collapsed form, for in the collapsed condition of the form the dress is most easily fitted upon it, or taken from it. With a dress upon the form, the form may be expanded to the proper size, accomplishing the stretching of the dress in all directions by equal or equivalent amounts, and without undue strain in any given region, and after the dress is finished the form may be collapsed to an extent that makes removal of the dress simple, with no mussing.

It is also an object to provide indicator means which are independent of but connected for movement with the expanders at the several zones, which will indicate at a glance to the operator the exact circumferential dimension at such zone, while the adjustment of the form is proceeding.

It is a particular object to provide convenient power-operated mechanism for accomplishing the vertical adjustment of the form for height and for spacing between the several zones, and to provide convenient means for limiting and accomplishing this vertical adjustment.

As has been suggested, such a figure is conveniently made up of several individual zonal expanders corresponding, for example, to the shoulders, bust, waist, and hips of a human figure, which expanders will cooperate in general to define the outline or contour of the human figure, but it is preferred that the remainder of the figure (and this is particularly important with relation to the skirt portion) be filled in by longitudinals connecting the various zonal expanders. Preferably single flexible longitudinals extend from the lowermost, or hem expander, to the uppermost or shoulder expander, being engaged by the intervening expanders. However, since adjustment must be made as to height and as to spacing between individual expanders, and as to circumference at each expander, and since these various adjustments will require different effective lengths of the longitudinals, we prefer that there be employed take-up means, such as may be associated with each individual longitudinal, by means of which the individual longitudinals may be maintained properly taut and in the proper contour of the figure.

Since such a form must inevitably be as tall as the distance from the hem to the shoulder of a dress which will fit any given person, and might be difficult to fit a dress upon because of its height, especially if elevated upon a pedestal, or if always of maximum height, it is an object to construct the form in a manner which requires but a minimum of elevation above the floor, and which permits its ready collapse vertically to a size enabling an operator, standing upon the floor alongside the form, readily to fit a dress upon it or to remove a dress from it.

With these and other objects, as will appear hereafter, the invention comprises those principles best illustrated by way of example in the accompanying embodiment, as shown in the drawings, and as hereafter explained, and as will be more particularly defined by the claims. It will be understood that the form illustrated is purely representative and illustrative, and that the invention is not restricted thereto other than as is made clear in this specification and in the claims.

Figure 1 is a general elevation of the invention as a whole, parts being broken away or omitted for clearer illustration of the general principles.

Figure 2 is in general a section, the viewpoint being at 90° to that of Figure 1, illustrating the figure as a whole.

Figure 3 is a plan view of the control stand, and Figure 4 is in part an elevation and in part a section through an individual control valve.

Figures 5 to 9 inclusive pertain to the shoulder expander and the associated indicator unit, the latter of which is common to all the expanders. Figure 5 is in part an elevation and in part a section through this uppermost unit; Figure 6 is in part a front elevation and in part a section through the same; Figure 7 is a transverse section through an individual indicator; Figure 8 is a section, substantially on the line 8—8 of Figure 6; and Figure 9 is a detail section substantially on the line 9—9 of Figure 6.

Figures 10 to 13 inclusive pertain primarily to the bust expander, although Figure 12 illustrates a detail common to most of the expanders. Figure 10 is in part an elevation and in part a horizontal section through the bust expander; Figure 11 is a front elevation with parts broken away to show the interior construction thereof; Figure 12 is a detail, partly in section, of means to limit or determine the vertical adjustment of the expander; Figure 13 is in general a section on the line 13—13 of Figure 10.

Figure 14 is a view similar to Figure 12, illustrating a different type of means to determine the vertical adjustment or spacing of the expanders.

Figure 15 to 18 pertain primarily to the waist expander. Figure 15 is a view similar to Figure 10; Figure 16 is a view similar to Figure 11; and Figures 17 and 18 are respectively vertical and horizontal sections of details of the expander and of its relationship respectively to the longitudinals and to the complemental transverse expander elements.

Figures 19 and 20 pertain primarily to the hip expander. Figure 19 is a view similar to Figures 10 and 15, and Figure 20 is a view similar to Figures 11 and 16.

Figures 21 and 22 pertain primarily to the hem expander, Figure 21 being a view similar to Figures 10, 15 and 19, and Figure 22 being a view similar to Figures 11, 16, and 20.

Figure 23 is a detail of the carding tape employed to engage and hold down the hem, which is associated with the hem holder and expander.

The figure, as has been indicated, is generally of human shape. This is not to be understood as requiring it to have arms and legs, but more strictly speaking it conforms to the shape of garments which are worn by humans or which are draped upon the human figure. Since the difficulties mentioned above are met with primarily in connection with women's clothes, the figure conforms primarily to the shape of women's clothes, and the lower portions have more or less the contour of a woman's skirt. Also, since clothes are usually worn with more or less looseness, the figure may be so expanded that it does not represent the actual human figure of the wearer, but rather the expanded size of the clothes which fit loosely upon that human figure. It is this meaning which in this specification is to be understood when the figure is described as "generally of human shape." Indeed, such figures may be employed with skirts only, and in such case it is not outside the intended meaning if the parts above the waist be omitted.

In its general characteristics the figure comprises a shoulder expander S, a bust expander B, a waist expander W, a hip expander H, and a hold-down ring or hem expander R, disposed one above another and suitably supported, and prevented from rotating relative to one another. At a convenient point, preferably in the position corresponding to the head of such a figure, there is mounted an indicator I.

The support is formed of several individual parts, one of which is associated with each of the expanders, which are relatively movable vertically; conveniently, and preferably, the arrangement comprises several telescopingly connected and slidable tubular elements with a power jack, preferably a fluid-pressure operated jack, within the telescoping tubular assembly, whereby the same may be collapsed downwardly to a desired extent, or projected vertically to a desired maximum. Means are provided to determine or limit separation of each expander from adjacent expanders, and hence the total height of the figure. Relative rotation of the expanders, about the support, is suitably prevented.

Preferably each expander is made up primarily of plates which define the principal contours at each respective zone, that is, the points of greatest convexity and greatest size variations in the human figure, to which may be connected, for corresponding movement, secondary circumferential members completing the circumferential contour at each such zone. The expansion in each zone may be accomplished by similar jack means forming part of or incorporated within the expander. Such jack means are arranged to react from the central support or from a part of its expander which is secured to the central support, and the jacks are directed to accomplish movement of the primary contour-forming elements, each in its respective zone, in a direction and by amounts which correspond to the directions and amount of size variation in human figures. However, it is not to be understood as an essential element of the invention, in certain respects, that the expansion in any given zone be in the direction of the principal variations of human sizes in such zones; for while this is preferable, even without this provision the form is useful if the circumferential extent be varied, providing the direction of expansion shall not depart too greatly from the direction of expansion of human figures in such zones.

Since the expanders incorporate the principal points at which human figures bulge, such as the bust and hips, the figure might be formed only by these expanders, but it is preferred that the spaces between these expanders, vertically, be filled in all around the figure. Among other reasons this is desirable to prevent dresses from sagging within the form, and possibly contacting parts of the mechanism. At the same time, the actual surface area contacting the dress must be slight, to impede by the minimum the access to and passage through the dress of air blown within it. Accordingly it is preferred that narrow individual longitudinals or flexible metal tapes be employed, extending from the hem expander R through the various expanders in order—the hip expander H, the waist expander W, the bust expander B, and up to a connection with the shoulder expander S. For reasons which have been pointed out these longitudinals are provided with take-up mechanism, preferably individual take-up devices for each longitudinal, so that they may be kept taut and in the proper contour of the figure as variations occur, due to vertical adjustment or circumferential expansion.

To the individual expanders are connected indicating devices which are not affected by vertical adjustment, but which are sensitive to increase in circumferential extent. These indicators are preferably grouped all in one place, as for instance at the head portion of the figure, so that the operator has constantly before him an indication of the precise measurement or size of the figure at the zone where he is accomplishing an adjustment, and will not fail to expand the expander sufficiently, nor will he unknowingly expand it too greatly.

Likewise it is our intention to provide means which are associated with the hem expander R to store and make available, as the expander expands and contracts, carding tape, which may be engaged with the hem of the dress to hold it down upon the form, enabling proper adjustment to the correct length. By reason of the arrangement of this carding tape relative to the remainder of the form, and by reason of the collapsibility of the form, particularly vertically, the dress may be automatically disengaged from the carding tape.

It is also our intention to provide, in association with such a figure, means to supply steam or air, whether warm or of room temperature, and thereby to accomplish various processes in connection with the cleaning or drying of a dress which is upon the form. The latter provisions, however, are suitable for use with various types of forms, and are not considered part of the present invention, which deals rather with the form per se.

Since it is more convenient and considerably quicker to accomplish adjustments in the various zones, or for height, from a point outside the figure than from a point inside, we provide a control stand adjacent the figure but alongside thereof, where the operator may stand and accomplish all the necessary adjustments, or substantially all theerof, while at the same time observing the measurements of the figure at the indicator I. Since the adjustments are preferably all accomplished by power means, such as fluid-operated jacks, this is very readily accomplished by mounting the control valves for these jacks in a control stand outside the figure, and by connecting them to the jacks within the figure by any convenient type of conduits, extending upwardly within the figure.

The central support, in the form shown, is made up of telescopingly connected tubes 10, 11, 12, and 13, arising out of a surrounding tubular stem 14. Each such tubular section of the central support carries a spider, including a sleeve at its upper end, designated, 15s, 15b, 15w, 15h, and 16, of which all but the latter constitute reaction points which are in effect part of the respective expanders S, B, W, and H. The hem expander R has a further reaction point 15r, which engages about the tube 14.

Within the assembly thus formed, and constituting in the aggregate the central upright support, is a jack, which conveniently takes the form of a jack cylinder 17 and a piston or plunger 1 (see Figure 2). The stem 18 of the plunger projects upwardly through the upper end of the cylinder 17 to engage the member 15s of the shoulder expander. The plunger 1 has an appreciable range of adjustment, sufficient to collapse the form to any desired minimum extent, and to project it upwardly to any desired height.

By pushing upwardly on the expander S each expander in succession may be drawn upwardly if means are provided to tie together the successive expanders. This end is accomplished, and relative rotation of the expanders about the axis of the jack cylinder 17 is accomplished, by mechanism such as that which will now be described.

As is best shown in Figures 2, 12, and 14, a gauge stick 2 is carried by the uppermost expander sleeve 15s, to which it is secured (see also Figure 8), and runs through guides in each successive expander sleeve. This gauge stick is provided with spaced holes 20, within which are engageable locking dogs carried by each expander below the uppermost, and by the sleeve 16. At the bust expander is a locking dog 21b, at the waist expander a dog 21w, and at the hip expander a dog 21h. The dog 21x, carried by the sleeve 16, may be somewhat differently operated. If the gauge stick 2 as thus arranged is excessively long, and if it thereby tends to prevent vertical collapse of the figure to the required extent, it may be divided into two such gauge sticks, one for the upper part and one for the lower part of the figure.

Since certain of the details of construction have been omitted to avoid obscuring the showing in Figures 1 and 2 the construction of the dogs and the manner of their operation may be best understood by reference to Figure 12. It will be seen that the dog 21b is pivoted at 22 to a bracket 15y carried by the sleeve 15b, and that a spring 23 extending between the bracket and the dog is arranged to pass across a center, and therefore holds the dog either in the full-line engaged position or in the dash-line disengaged position. Vertical adjustment may be accomplished by energizing the jack 1, 17 to move the figure upwardly until the correct or desired spacing is obtained between the expander S and the expander B, whereupon the dog 21b is thrown by hand into the proper hole 20 of the gauge stick 2. This locks together the expanders S and B, and determines their spacing. In similar fashion the spacing between the expanders B and W, and between the expanders W and H, and finally between the expanders H and R, may be determined and fixed in the same way. The last mentioned spacing, however, is conveniently accomplished by connecting a link 24, connected to an arm 21y of the dog 21x, through various linkage arrangements, indicated generally at 25, to a treadle 26 at the operator's station. This is possible with this particular dog for the reason that the sleeve 16, whereon it is mounted, does not move vertically.

An alternative arrangement is shown in Figure 14, wherein the dog 21z is similarly pivoted, but its disengaged position, shown in dot-dash lines, is but slightly removed from its engaged position, since the dog is suitably stopped and held in the disengaged position. The dog is provided with a heel 21v, positioned to be engaged by a stop 27 which is carried by a slide 28, which slide likewise supports a spring-held pin 29, engageable within the holes 20. The slide 28 may thus be previously positioned to determine the spacing between the several expanders, and then upon upward movement of the form as a whole, and of the gauge stick 2 with the shoulder expander S, the stop 27 for each expander engages its dog 21z, which is normally held in unlocked position, and throws the latter into the locked position in engagement with the proper hole 20; in the latter position it is held by its spring 23. This permits presetting of the spacing between expanders, and automatic fixing thereof in adjusted position as the form is adjusted upwardly.

At the operator's station, conveniently collected in a stand 9, are a series of controls including a control valve 19 for the jack 1, 17 (for details see Figure 4). This jack may be operated by compressed air or by a liquid under pressure, the supply whereof is by means of a conduit 90 and the return whereof is by means of a conduit 91. Other valves for jacks at each of the expanders are also collected here, as will be described later.

The bust expander may be described as typical of the principal expanders. The sleeve 15b, which is secured at the upper end of the tubular section 11 of the support, may be considered part of the bust expander, for it is the reaction point from which the expansion proceeds. At the bust zone, differently from other zones, the expansion is largely forwardly and somewhat outwardly in direction, and there is little or no expansion rearwardly. The points of the greatest convexity, of course, are to the front, and therefore the expander is simply and conveniently formed primarily by the bust plates 3b, shaped to define the breast contours. The remainder of the bust expander is formed of a plate 31b at the rear, which may be connected directly to a bracket 15y that constitutes part of the sleeve 15b, and flexible and extensible elements, such as the spring-like bands 32b, which are received and guided in the plate 31b, and which extend thence around the sides at least to a connection with the bust plates 3b. The bands 32b may be part of the bust plates 3b or may be secured thereto, or may extend therebehind. They preferably do not extend across the front, between the two bust plates 3b, but if desired similar bands 33b may be provided, extending between the two bust plates and capable of sliding relative to each as the bust expander is expanded or contracts.

The expansion is accomplished by means of pneumatic or hydraulic jacks, generally designated 30b. Because of the small minimum size at the bust, and the possible large maximum size, the jacks which accomplish the expansion at the bust are preferably duplex jacks. However, this is a detail which may vary in accordance with the design and in accordance with the range of expansion and contraction at any given zone. It need only be considered that such a jack includes a piston 34b slidable within a cylinder 35b, which is supported from the bracket 15y, and directed, in the bust expander, divergingly from the back 31b. The piston rod or stem 36b is preferably secured directly to the bust plate 3b. Fluid under pressure is supplied to the two diverging jacks 30b from an individual supply conduit 37b extending upwardly within the form from a control valve 38b at the control stand 9. Such a valve may resemble the valve 19, illustrated in Figure 4, except that it is single-acting.

At other expanders the arrangement is similar. At the waist expander, shown in Figures 15 and 16, the jacks 30w, made up of the cylinders 35w and pistons 34w, are arranged substantially parallel (one would suffice if it were feasible to locate it centrally) and project the stems 36w and the connected waist plate 3w forwardly. Thereby the bands 32w are drawn somewhat forwardly, and by their flexibility are permitted to expand outwardly, as is shown in the dot-dash lines. The back plate 31w is supported from the sleeve 15w, as are the jacks 30w. Fluid under pressure is supplied from the conduit 37w by way of a valve 38w. At the hip expander the situation is substantially reversed with relation to the situation at the bust expander, for here the movable hip lates 3h are disposed at the rear, and the jacks 30h diverge rearwardly and outwardly. Whereas in the waist expander the jacks are only simplex, here in the hip expander, as in the bust expander, the jacks are normally duplex, but reversed. The fixed plate 31h is now located at the front instead of at the rear.

The hem expander R is somewhat different from the others in that the hem of a dress is largely circular, and the expansions for variation of size are not materially greater in one direction than in another. It is possible, therefore, to make the hem expander R with jacks 30r that are radially directed from the ring 15r. There is an appreciable extent of possible variation in circumference, however, and therefore these jacks are preferably duplex. The circumferential parts of the hem expander are made up of the plates 3r, which are secured to the piston rods 36r, and of portions 32r which are slidable relative to adjacent circumferential sections, being in front of the adjacent section at one side and behind the adjacent section at the other side. Each such member 3r is provided with a horizontally disposed shoe or sleeve 30y, which supports the member 3r for sliding engagement along a guide 30x, which is parallel to the cylinder 35r. Further reference will be made to the construction of the hem expander.

The shoulder expander S is in the nature of a composite unit, inasmuch as the indicator I is mounted directly thereupon and associated therewith. The jacks 30s, comprising the cylinders 35s and the pistons 34s, are directed laterally outwardly and slightly downwardly from the central support, the piston rods 36s pushing outwardly telescoping shoulder pieces 3s, which are in part retractable beneath the shoulder forms 3x. Fluid is supplied to the jacks 30s by the conduit 37s.

In all instances the jacks may be double-acting, if desired, but for simplification it is preferred that they be retractable by springs 4s, 4w, etc. A control valve, such as the valve 19, is shown in Figure 4, and this valve is double-acting, for the jack 1, 17 is preferably a double-acting jack, and the other valves 38s, 38b, etc., may be similar to the valve 19 except as they are formed for operation in a single direction only, and for exhaust.

It is desirable that the operator have an indication at all times of the precise size of the figure at any given zone, and that all such indications be collected at the indicator I. However, because the expanders are located one above the other, and are adjustable vertically with relation to one another, yet expand laterally and circumferentially, it is necessary to provide a flexible connection between the indicator I and each individual zonal expander.

In Figures 16 and 17 a reel 50w is shown, carried upon a sleeve 51w which is journaled within the sleeve 15w. Received within the tube 51w is a stem 52w, and the two are so formed (the stem being square, for instance, and received within a square socket) that the tube may not rotate relative to the stem; rather rotation of the tube 51w effects rotation of the stem 52w, yet the two may slide relatively, axially of the tube. The tube is urged always to rotate in a given direction by a torsion spring 53w, to tension a wire or cord 54w which is carried upon the spool 50w, and which is connected at its ends at 55w to the plate 3w. In this manner the wire 54w, the tube 51w, and the stem 52w partake of the expansive or contractile movement of the waist expander W, and the stem 52w serves as a means to transmit that motion to the indicator I, to which the stem 52w extends through the interior of the form.

In similar fashion stems 52h extend upwardly from the hip expander, and stems 52b extend upward from the bust expander. There might be also a similar indicator from the hem expander R, but this is not so necessary, since the hem will normally be extended to whatever circumference seems necessary, without exact measurement, and to conform to the remainder of the garment. No stem for the hem expander has been shown therefore. Likewise as to the shoulder expander; the arrangement is a little different in view of the fact that there is no relative movement vertically between the shoulder plate 3s and the indicator I, therefore the spool 50s is mounted directly upon a shaft 52s, which is journaled in the composite shoulder and indicator unit.

It may be seen, particularly in Figures 5, 6, 7, and 8, that the shaft 52s within the indicator I carries a spool 56s, which is connected, by an endless cable 57s and by way of suitable pulleys, to a movable index or pointer 58s, which is slidable within a slot 59s within the indicator I. By suitably marking the exterior of the housing 5 which encloses and supports the various indicators the indices 58s, 58b, 58w, and 58h, and any other similar indicators, may show directly the size at the particular zone which corresponds to this index member. Adjustment may proceed accordingly, expanding or contracting the form at any given zone by suitable operation of the valves 38, until the operator, standing at the control stand 9, may tell by the corresponding indicator 58 the measurement at the corresponding zone.

As has been pointed out already, the expanders by themselves may be sufficient to define the principal points or contours of the figure, but preferably the figure is completed, and in particular the contours between the waist, hip and hem expanders are filled in and defined, by longitudinals 6. Preferably these are in the form of inextensible flexible tapes, such as the stainless steel tapes that are employed for linear measurements. There is, of course, no reason for measuring with such tapes, nor any reason why they need to be sufficiently stiff to be self-supporting to any extent. Preferably they are of sufficient length to extend continuously from the hem expander R to the shoulder expander S by way of each of the intermediate expanders, following the contours of the figure. Such tapes 6 are conveniently wound upon take-up reels 60 (see Figures 21 and 22) which are carried by the hem expander R, and which extend thence upwardly by way of the intermediate expanders to a point of connection at the shoulder expander S. Such points are indicated in Figures 6, 8, and 9, at 61. At the intermediate expanders these tapes are suitably guided so that the expanders may slide longitudinally of the tapes as the form is collapsed or expanded vertically, and so that the tapes may slide relative to the expanders as such movement is required by lateral expansion or contraction of the expanders. Such sliding connection is shown somewhat in detail in Figures 13 and 17. The guiding arrangement may be such that the tape slides vertically between underlying ears 62w, for instance, pressed out or secured to the inner side of an expander part, such as the waist plate 3w, or the tape may be sufficiently flexible transversely to curve to fit within a guide 62b in the bust plate 3b, as shown in Figure 13. At the same time circumferentially extending members, such as 33b in Figure 13, are slidable within guides 33x of Figures 13 or 17.

By such an arrangement the springs which take up the tapes, and which are concealed within the mechanism at 60, maintain each individual longitudinal taut, and because it is located close to the outside contour of the figure, by its tautness, and by its engagement within the successive expanders, it is kept always in this proper contour, regardless of the lateral or circumferential expansion on the one hand, or the vertical expansion on the other hand. A skirt which is placed upon the figure cannot drape or fall within the figure, by reason of the longitudinals which are properly spaced around the figure, and therefore cannot engage and be caught on nor interfere with the interior parts of the form.

It will be noted that the hem expander R does not move vertically, and that while the central part of each plate 3r is secured to the outer end of the jack stem or rod 36r, the other parts either overlie or underlie the side portions of the adjoining plates 3r. Suitable guides 3z are provided to hold in the outer ends of these flexible and somewhat resilient plates 3r, and the reels 60 are carried upon the underlying ends but not upon the overlying ends of each plate 3r. This is for the reason that, as may be seen in Figures 21 and 22, and likewise in Figure 23, there is associated with each such plate 3r a carding tape consisting preferably of a flexible metal plate 70, an overlying heavy woven tape 71, and carding fingers 7 mounted in the tape 71. The carding tape is preferably so formed that the fingers 7 are protected from above by a tape 72 which is of a thickness substantially coresponding to the length of the fingers 7. These tapes are carried upon the plates 3r, as has been indicated, and slide underneath the overlying ends of the adjoining plates. The carding fingers are not bent by, nor do they catch upon the overlying tape, by reason of the protective tape 72. The latter is beveled off at its upper edge, as indicated at 73 in Figure 23, and while the downwardly turned fingers 7 are readily engaged with the hem of a dress to hold it down, whenever the form is collapsed vertically the dress is substantially automatically disengaged from the fingers 7 as the dress droops downwardly. Of course it may be necessary, to accomplish this, that the hem expander R be somewhat contracted, but this automatic disengagement from the carding tape facilitates and speeds up greatly the operation of finishing a dress upon the form, while the provision of excess overlapped lengths of the carding tape assures that there will always be presented, about the entire circumference, a sufficient and continuous length of carding tape to hold down the hem of any dress.

In Figure 18 is illustrated an arrangement which is particularly desirable at such zones as the waist, where there is considerable circumferential expansion from a very small minimum to a rather large maximum. The band $32w$ must not be permitted to expand from its guide $33x$ sufficiently to pull the end of the band $32w$ from the guide. The guide, therefore, is provided with a spring finger $33y$ which bears upon the band $32w$, and which may engage within a recess $33z$ in the band when the band has nearly reached the limit of its outward extent. This automatic engagement prevents pulling out the band $32w$ from its guide, yet does not impede its movement inwardly.

As is best seen in Figures 1 and 2, the entire device is mounted on or above a pedestal 8, wherein may be arranged such auxiliary devices as a fan 80 to blow air through the open top 81 of the pedestal and within the garment upon the form. The height of the form might be decreased if such devices were sunk into the floor, but ordinarily this is not feasible, and in any event the vertical collapse of the form enables ready access and use of the form by an operator standing on the floor alongside it. A steam ring 82, supplied from a pipe 83, permits controlled admission of steam to the interior of the garment which is upon the form. Such arrangements are not in themselves a part of the present invention. It is only important that the form as a whole be sufficiently open to allow free access of air, steam, or similar fluids which are admitted to the interior of the form and of the garment thereupon, to which end the longitudinals and separate zonal plates are provided, and the latter, as also their extending bands, may be perforated, as preferred, and as is desired.

It is believed that the manner of use of the device has been sufficiently described during the progress of this specification, and will be obvious to cleaners who have heretofore employed supports in the nature of dress hangers for holding garments open while air, steam, and the like are blown within them.

What we claim as our invention is:

1. In a cleaner's garment sizing form, in combination with a central support, a bust expander including two bust plates and complemental surface-defining elements, two two-part jacks, one for each bust plate, one part reacting from the central support and the other part being connected to its bust plate, the two jacks diverging from the back part of the expander, whereby to project the bust plates forwardly and outwardly, means to energize the jacks, and an indicator including a movable member carried by the expander and fixedly positioned relative to the central support, and a second member fixed for movement with a bust plate, and operatively connected to move the first member, corresponding to movement of the bust plate.

2. A cleaner's garment sizing form comprising a plurality of upright, telescopically disposed, relatively vertically slidable tubes, jack means reacting solely between the lowermost tube and the uppermost tube to move the tubes vertically, a plurality of zonal expanders each carried by a different support tube for vertical adjustment therewith relative to other support tubes and their expanders, said expanders cooperating to define a figure of generally human shape, each such expander being organized and arranged to effect expansion, in its own zone, in directions and by amounts corresponding to human size variations in such zone, a gauge stick paralleling the tubes, and connected to the uppermost tube, and means for connecting each expander, at various selected distances from the expander above, to the gauge stick, thereby to support and limit the relative spacing of each intermediate expander.

3. A cleaner's garment sizing form as in claim 2, including further means to secure the gauge stick to the lowermost tube.

4. A cleaner's garment sizing form comprising an upright support, a plurality of zonal expanders supported upon and vertically adjustable in position along said support, a lowermost, fixedly positioned expander, a plurality of flexible longitudinals each extending from the lowermost expander, past each intermediate expander to a point of securement on the uppermost expander, said expanders and said longitudinals cooperating to define a three-dimensional figure of generally human shape, and each expander being organized and arranged to effect expansion, in its own zone, in directions and by amounts corresponding to human size variations in such zone, and spring reels carried by the fixedly positioned lowermost expander, one being associated with each individual longitudinal to automatically adjust its length, in accordance with vertical or expansional adjustments of the figure, and to maintain it taut throughout its length.

5. A cleaner's garment sizing form comprising an upright interior support, a plurality of zonal expanders spaced vertically upon said support, said support being formed as a plurality of telescopically connected elements, upon each of which a different expander is mounted, for relative vertical adjustment, and said expanders cooperating to define a figure generally of human shape, and each expander including a circumferential hoop anchored at one side to its support element, and means reacting from each such support element to expand the other sides of said hoops, the several expanders being organized and arranged, and their anchorage being so chosen, relative to other expanders, as to effect expansion, each in its own zone, in such directions from the support and by such amounts as correspond to human size and shape variations in corresponding zones.

6. A cleaner's garment sizing form comprising an upright interior support, a plurality of zonal expanders spaced vertically upon said support, and cooperating to define a figure of generally human shape, each such expander including a circumferential hoop anchored at one side to the support, fluid pressure jack cylinders likewise supported entirely from said support, as part of each expander, the plunger of each jack engaging the unanchored portion of the corresponding hoop, and being directed and movable in such direction as to accomplish expansion, in each expanded zone, in such directions and by such amounts as correspond to human size variations in the corresponding zone.

7. A cleaner's garment sizing form comprising an upright interior support, a plurality of zonal expanders spaced vertically upon said support, at bust, waist, and hip levels, respectively, and cooperating to define a figure of generally human shape, each such expander including a circumferential hoop, the bust and waist hoops being anchored at their rear side to the support, and being free to expand in generally forward directions, and the hip expander hoop being similarly anchored at its forward side, and being free to expand rearwardly, and means reacting from said support, adjacent the anchorage of each hoop, against the free portion of such hoop, and directed to expand each hoop in an appropriate direction, to effect expansion, each in its own zone, in such directions and by such amounts as correspond to human size variations.

JOHN W. BELL.
ALFRED F. LARSEN.